United States Patent [19]

Hall

[11] Patent Number: 5,744,170
[45] Date of Patent: Apr. 28, 1998

[54] GUIDED HIGH PRESSURE PRESSES

[76] Inventor: H. Tracy Hall, 1711 N. Lambert Ln., Provo, Utah 84604-1858

[21] Appl. No.: 751,412

[22] Filed: Nov. 18, 1996

Related U.S. Application Data

[63] Continuation-in-part of Ser. No. 623,058, Mar. 28, 1996, abandoned, which is a continuation of Ser. No. 234,790, Mar. 14, 1994, abandoned.

[51] Int. Cl.$^6$ .................................................. B30B 7/00
[52] U.S. Cl. ........................... 425/77; 425/330; 100/232
[58] Field of Search .......................... 100/232; 425/77, 425/330, DIG. 26

[56] References Cited

U.S. PATENT DOCUMENTS

| | | |
|---|---|---|
| 2,941,248 | 6/1960 | Hall .................. 425/77 |
| 3,100,912 | 8/1963 | Lloyd et al. ........... 425/77 |
| 3,107,395 | 10/1963 | Bundy ................ 425/77 |
| 3,134,139 | 5/1964 | Wentorf, Jr. .......... 425/77 |
| 3,159,876 | 12/1964 | Hall .................. 425/77 |
| 3,182,353 | 5/1965 | Hall .................. 425/77 |
| 3,278,993 | 10/1966 | Brayman et al. ....... 425/77 |
| 3,384,926 | 5/1968 | Tsujii ................ 425/77 |
| 3,440,687 | 4/1969 | Hall .................. 425/77 |
| 3,555,607 | 1/1971 | Epain et al. .......... 425/77 |

FOREIGN PATENT DOCUMENTS

| | | | |
|---|---|---|---|
| 218231 | 4/1961 | Australia | 425/77 |
| 45-28952 | 9/1970 | Japan | 425/77 |
| 46-4944 | 2/1971 | Japan | 425/77 |
| 46-36879 | 10/1971 | Japan | 425/77 |

*Primary Examiner*—James P. Mackey
*Attorney, Agent, or Firm*—Workman, Nydegger & Seeley

[57] ABSTRACT

High pressure presses for making diamonds and other hard, crystalline materials. The high pressure presses may contain varying numbers of moveable press members: e.g., a tetrahedral press will have four press members while a cubic press will have six press members. The high pressure presses are equipped with at least one hydraulic ram to provide forward and reverse thrusting force. The movable press members are positioned to move along a rectilinear path and converge at a common point. The ram thrusting force is distributed to every press member and the movable press members are guided to move in a simultaneous and synchronous manner by interconnected guide plates and slidable guide rods which comprise a guide system. The guide system allows for the elimination of one or more hydraulic rams such that the total number of hydraulic rams normally connected to each of the moveable press members will be less than the number of press members. The resulting high pressure press is therefore smaller, less expensive, and easier to maintain compared to high pressure presses known in the art that include a hydraulic ram directly connected to each moveable press member.

20 Claims, 4 Drawing Sheets

GUIDED HIGH PRESSURE PRESSES

BACKGROUND OF THE INVENTION

1. Related Applications

This application is a continuation-in-part of U.S. application Ser. No. 08/623,058, filed Mar. 28, 1996, now abandoned, in the name of H. Tracy Hall for "Guided High Pressure Cubic Presses", which is a file-wrapper-continuation of U.S. application Ser. No. 08/234,790, filed Mar. 14, 1994, now abandoned.

2. Field of the Invention

The present invention relates to improved high pressure presses used for the manufacture of synthetic diamonds and other hard crystalline materials. In particular, the present invention relates to high pressure presses that include a guide system that enables the elimination of one or more hydraulic rams normally attached to each press member.

3. Description of the Prior Art

Nearly all high pressure-high temperature equipment in use today that can sustain diamond-making conditions of pressure and temperature are based on the inventions of H. Tracy Hall. They comprise the Tetrahedral Press (U.S. Pat. No. 2,918,699), High Temperature-High Pressure Press (commonly called the Belt) (U.S. Pat. No. 2,941,248), and the High Pressure Press (U.S. Pat. No. 3,159,876), of which the Cubic Press (or six-member press) has become the most important member covered by this particular patent. While the Belt and the Cubic Press have enjoyed considerable commercial success and application, the Tetrahedral Press has been used mainly for experimental and laboratory purposes.

More than 750 Cubic Presses are presently used in making synthetic diamond and cubic boron nitride in China. General Electric and DeBeers currently employ several hundred very large Belts in their manufacturing operations. The manufacture of synthetic diamonds has become extremely important to the world economy. Yearly diamond production alone can be measured in tons.

Although a tremendous breakthrough on its own right, the Cubic Press was vastly improved by the incorporation of the guide apparatus taught in U.S. Pat. No. 3,182,353 (entitled Guide Means for High Pressure Press) into the Cubic Press. For simplicity, this combination of inventions has often been referred to as the Anvil Guide. All of the above inventions are well known and widely used in the art today and they are incorporated by reference into this patent application. For purposes of disclosure, the foregoing patents are incorporated herein by specific reference.

Without going into detail about the mechanisms of the cubic presses set forth above in the foregoing patents, suffice it to say that each of the above-identified patents teaches that each anvil or press member is independently driven forward by means of a corresponding hydraulic ram attached thereto. In other words, none of the above-identified patents teaches or suggests a mechanism by which the mechanical forces applied to one or more press members attached to hydraulic rams may be transferred to one or more press members not attached to hydraulic rams.

In fact, since the inception of the Anvil Guide over 30 years ago, cubic presses that employ the anvil guide have always an independent hydraulic ram for each press member. This is so because those of ordinary skill in the art have always believed it necessary to have independent hydraulic rams for each press member in order for proper function of the Anvil Guide.

In light of the foregoing, it would be an improvement in the art to provide a high pressure press that is smaller, more lightweight, and which occupies less floor space compared to existing presses.

It would be a further advancement in the art of synthetic diamond-making to eliminate one or more of the hydraulic rams such that there is at least one fewer hydraulic ram than the number of press members and such that at least one press member is not directly attached to a hydraulic ram.

It would yet be an advancement in the art to simplify the operation and maintenance of high pressure presses by eliminating one or more hydraulic rams, which are known to require individual maintenance in order to keep the entire system in good working order.

Such improved high pressure presses that eliminate one or more hydraulic rams are disclosed and claimed herein.

SUMMARY OF THE INVENTION

The present invention is a clear improvement over the high pressure presses described in the background section because it allows for the elimination of one or more of the hydraulic rams normally attached to each of the individual press members. It has been found that by means of a novel guide system similar to the one set forth in U.S. Pat. No. 3,182,353, the forces from the remaining imperfect complement of hydraulic rams can be transferred to each of the press members by means of the novel guide system.

Whereas the conventional wisdom is that each of the six anvils in a cubic press must be driven forward by one of six hydraulic rams attached to each anvil in order to develop sufficient pressure necessary to form diamond or other hard crystalline materials, the novel guide system of the present invention allows for transfer of the necessary mechanical forces from the one or more press members directly connected to the hydraulic ram to the one or more press members not directly attached to a hydraulic ram. In this way, the over all high pressure press apparatus is simpler, lighter, less expensive, and requires less maintenance. Each hydraulic ram must be systematically tested and adjusted on a periodic basis in order to maintain its ability to press with substantially the same force and speed as each of the other hydraulic rams. Reducing the number of hydraulic rams greatly simplifies the manufacture and maintenance of high pressure presses.

In light of the foregoing, the present invention may be characterized as comprising a plurality of press members that are mechanically interconnected by means of a guide system such that each of the press members is mechanically urged toward a central point synchronously and symmetrically regardless of the number of hydraulic rams that are employed. Thus, whereas the elimination of one hydraulic ram is an improvement over the prior art, the elimination of even more hydraulic rams is a greater improvement, with the elimination of all but one hydraulic ram being generally more preferred.

For example, in the case of a tetrahedral press that includes four press members, the use of three hydraulic rams instead of four is preferred, the use of two hydraulic rams is more preferred, and the use of one hydraulic ram is most preferred. Likewise, in the case of a cubic press having six press members, the use of five hydraulic rams is an improvement over conventional cubic presses that employ six hydraulic rams. In general, the elimination of more hydraulic rams is more preferred, while including only a single hydraulic ram is more preferred in most cases.

In light of the foregoing, it is an object of the present invention to provide a high pressure press that is smaller, more lightweight, and which occupies less floor space compared to existing presses.

It is a further object of the present invention to eliminate one or more of the hydraulic rams such that there is at least one fewer hydraulic ram than the number of press members such that at least one press member is not directly attached to a hydraulic ram.

It is yet a further object and feature of the present invention to simplify the operation and maintenance of high pressure presses by eliminating one or more hydraulic rams, which are known to require individual maintenance in order to keep the entire system in good working order.

These and other objects and features of the present invention will become more fully apparent from the description which follows, or may be learned by the practice of the invention.

DESCRIPTION OF THE PREFERRED EMBODIMENTS

The present invention encompasses novel guide systems which mechanically interconnect each of a plurality of press members of a high pressure press such that each of the press members is mechanically urged toward a central point synchronously and symmetrically regardless of the number of hydraulic rams that are employed. Thus, the present invention is a clear improvement over conventional high pressure presses, such as the Cubic Press or the Anvil Guide presses used in industry. The present invention allows for the elimination of one or more of the hydraulic rams normally thought to be required to drive each of the press members forward toward the central point. The novel guide system of the present invention allows for transfer of the necessary mechanical forces from the one or more press members directly connected to its own hydraulic ram to the one or more press members not directly attached to a hydraulic ram. In this way, the overall high pressure press apparatus is simpler, lighter, less expensive, and requires far less maintenance.

Figure 1:
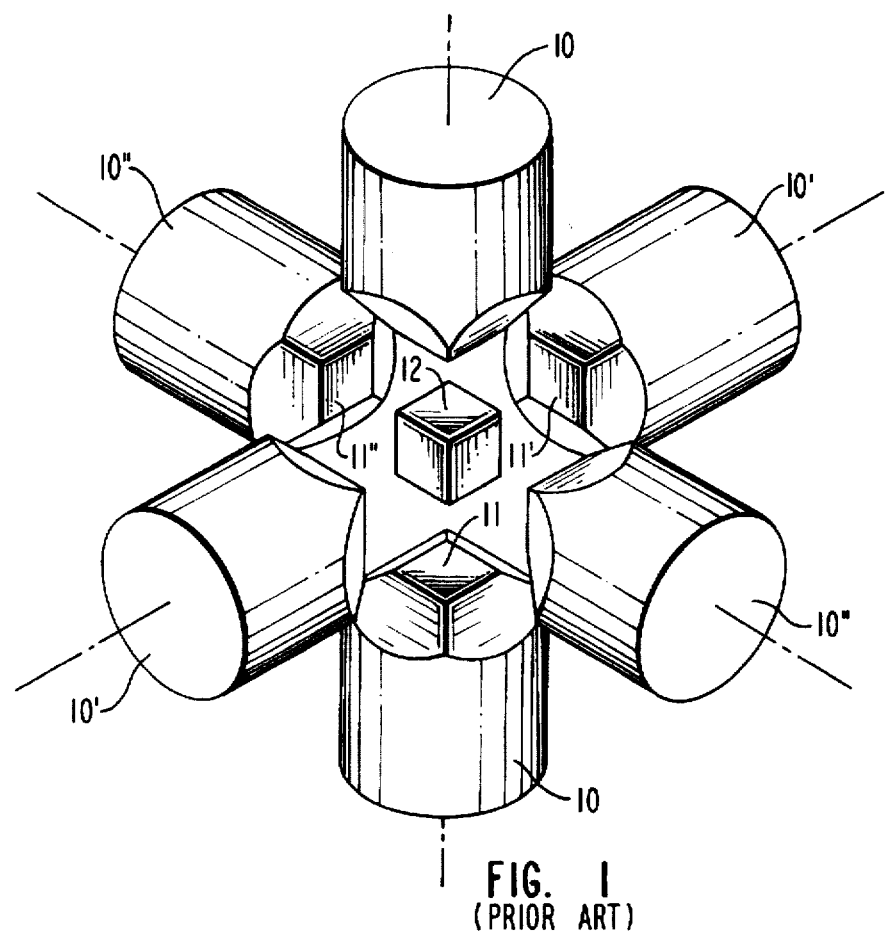
FIG. 1 is a schematic illustration of a prior art cubic press.

For a review of the mechanics of a standard Cubic Press, Applicant refers to FIG. 1. FIG. 1 depicts six anvils with square faces and 45° sloping shoulders that advance toward a cube shaped reaction cell that contains the sample to be mechanically compressed and electronically heated. Each of the six anvils is connected to one of six hydraulic rams, which cause each of the six anvils to be independently driven towards a central reference point, as discussed hereinafter. As shown schematically in FIG. 1, the Cubic Press includes a pair of identical anvils 10 having equal square faces 11 mounted for rectilinear movement along a first common axis. Two additional pairs of identical square faced anvils 10' and 10" are also mounted for rectilinear movement along second and third common axes and are positioned to lie in a plane normal to the first axis common to the first pair of anvils 10. The three pairs of anvils converge toward a common intersection or point, with the six faces of the anvils defining the six faces of a cube at their positions of contact.

The six anvils converge together to compress a cube-shaped cell 12 comprising graphite and other components. For a detailed description of the composition of cell 12, Applicant refers to any of the above-referenced prior art patents relating to the Cubic Press or any variation thereof. The main body of cell 12 is fabricated from pyrophyllite. Within the body of the cell are steel current rings (not shown) contacting molybdenum current disks (not shown). Contacting the molybdenum disks is a cylindrical graphite tube and graphite end disks (not shown). The graphite tube serves as a resistance heater and container.

Each edge of the cube shaped cell 12 is approximately 25% longer than the corresponding edge of the square faced anvils 10, 10' and 10". As the anvils are driven forward, they contact the faces of cell 12 in symmetrical fashion and penetrate the pyrophyllite, causing it to extrude between the sloping shoulders of the anvils. This automatically forms a gasket that is capable of further advance and compression of the anvils and easily develops and contains pressures up to about 60 kilobars. Pressures in this vicinity are generally required to transform graphite into synthetic diamonds.

Applicant now wishes to describe the guide system employed to transfer the forces from one press member to another. The guide system operates in similar fashion to the guide system set forth in U.S. Pat. No. 3,182,353 directed to the Anvil Guide. Applicant refers to FIG. 2, which is a diagrammatic perspective view of the Anvil Guide used in a Cubic Press including the guide plates and guide rods. The Anvil Guide of this embodiment is provided with a press member guide and alignment means, which are generally illustrated at 100. The Cubic Press includes six press members which, while identical in construction and generally designated with the reference numeral 102, are also identified by one of the letter designation $a$ through $f$ so that the orientation of the press members may be more readily visualized. For simplicity, one may consider from FIG. 2 that the sides of the cubical cell 12 are formed by each of press members 102a, b, c, and d, while the top is formed by press member 102e and the base by press member 102f.

Each of the press members 102 comprises an anvil member 104 having a square face at its extended end. Each of the side walls of each of the anvil members 104 slopes away from its square face along each of the edges thereof. In the form of the invention shown in FIGS. 1-4, each of the anvil members 104 is supported in a binding ring 108, and each binding ring is provided with sloping faces that form continuations of the sloping faces of the anvil members 104.

Figure 2:
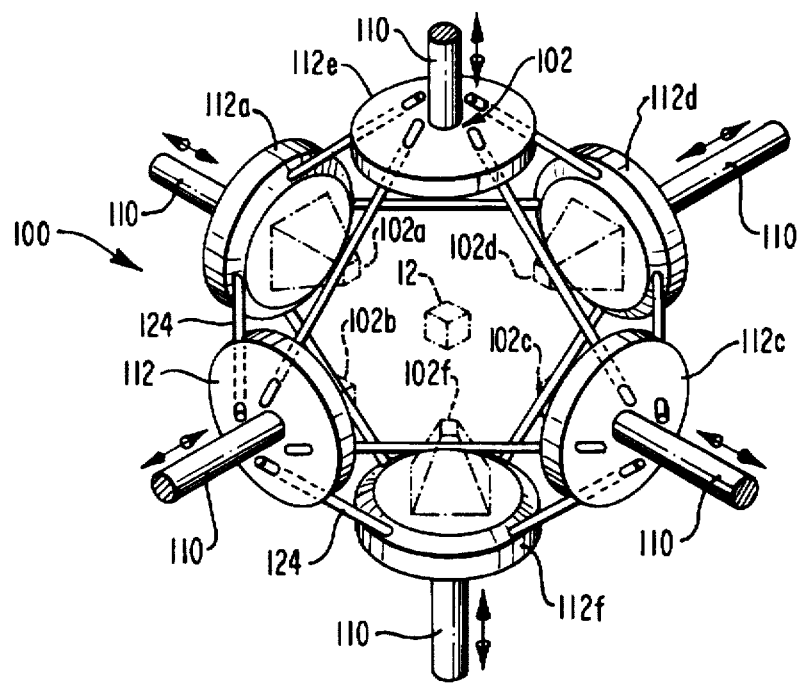
FIG. 2 is a diagrammatic perspective view of a prior art cubic press.
Figure 3:
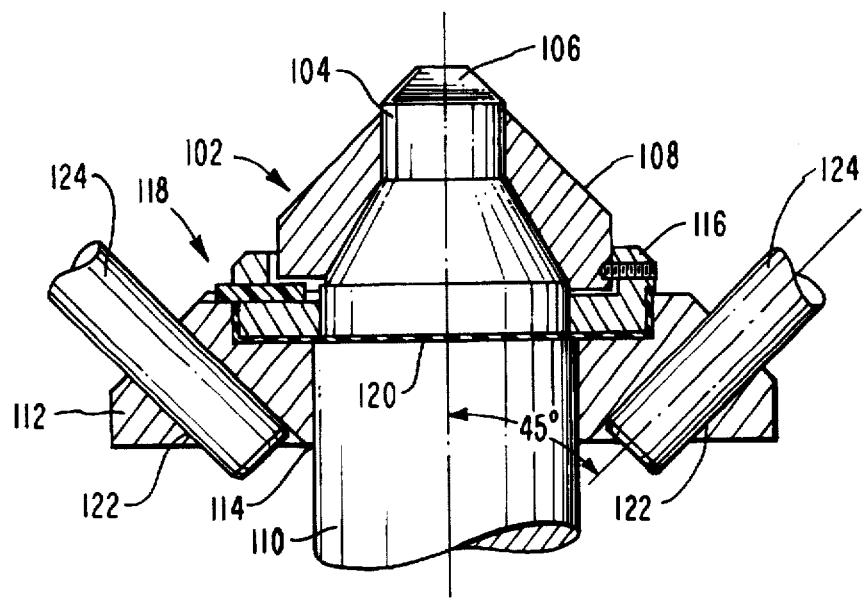
FIG. 3 is an enlarged fragmentary partial sectional view of a portion of the prior art cubic press shown in FIG. 2.

As shown by the arrows in FIG. 2, each of the six press members 102 of the prior art system is moved along a rectilinear path toward a common center by a hydraulic ram, the piston rods of which are illustrated at 110. In the present invention, one or more of the hydraulic rams are eliminated to make the press simpler, less expensive, easier to maintain and smaller.

The press member guide and aligning means set forth in U.S. Pat. No. 3,182,353, and depicted more particularly in FIGS. 3 and 4, include guide blocks or plates 112a, b, c, d, e, and f corresponding to each of the press members. The guide blocks or plates 112 are bored at 114 to receive the extended end of its respective piston rod 110. Each of the guide blocks 112 is secured to the end of its piston rod by suitable fastening means not shown in the drawings. The guide blocks 112 are each adapted to receive a centering ring 116. The centering rings, the guide blocks and the press members are oriented by means of suitable keys and keyways generally designated at 118. An insulating strip 120 may be provided between each of the guide blocks, the top of its piston rod and its centering ring and press member.

Figure 4:
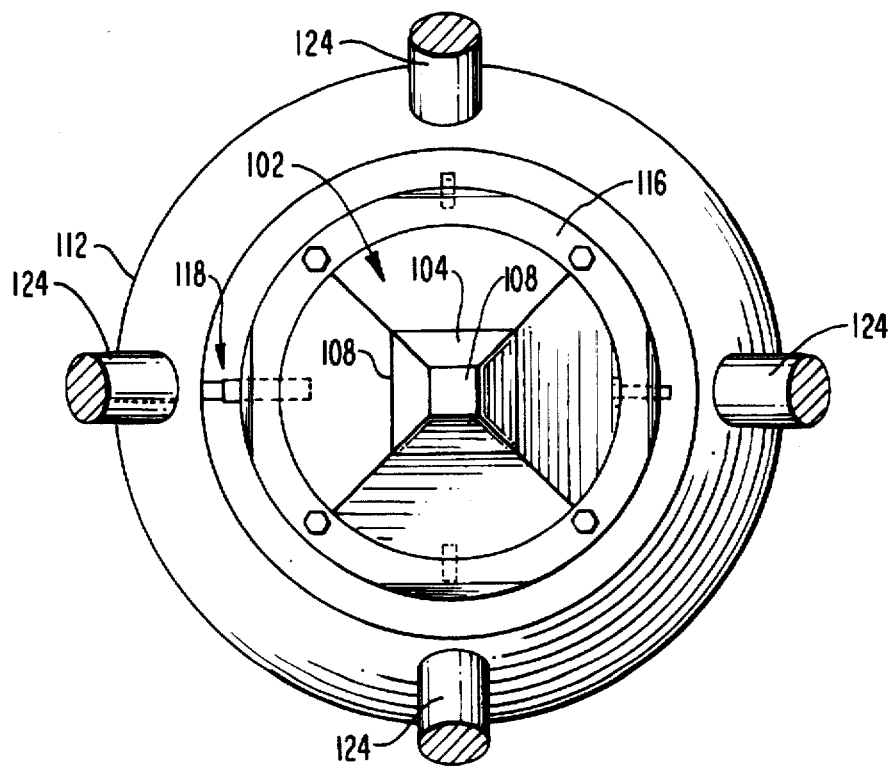
FIG. 4 is a top plan view of the portion of the prior art cubic press shown in FIG. 3.

Each of the guide blocks 112 is provided with four rectilinear bores 122 spaced 90° from each other and oriented with respect to the square edges of the face 106 of the anvil members 104 such that one is positioned directly opposite an edge as illustrated in FIG. 4 of the drawings. Further, each of the rectilinear bores 122 forms an angle of 45° with respect to the ram axis. Within reach of the rectilinear bores is slidably received one end of one of the guide rods 124. Thus the assembly includes 12 guide rods 124 to interconnect the six guide blocks of the cubical press.

In this invention, it will be noted that the axes of the guide rods define an octahedron. Since all of the press members are interconnected by guide rods and plates, press members are forced to move synchronously and symmetrically toward the center of the press. As the hydraulic rams connected to each of the anvils push inwardly, the octahedron defined by the guide rod axes decreases in size. Conversely, as the press members are retracted, the octahedron formed by the guide rod axes will expand in size.

FIG. 2 depicts an Anvil Guide system in which each anvil is directly attached to a hydraulic ram. It is to be understood that the two-way arrows located next to the piston rods 110 in FIG. 2 indicates the presence of six hydraulic rams mounted in a sturdy frame to each of the six anvils. These details are self evident and are not shown in order to simplify the drawings. The guide system of the present invention differs considerably since there are fewer than the full complement of hydraulic rams. Thus, the guide system provides the additional function of transferring the mechanical forces from the one or more press members directly attached to the hydraulic ram(s) to the one or more press members not directly attached to a hydraulic ram. In this manner, the total number of hydraulic rams can be reduced such that there is at least one fewer hydraulic ram compared to conventional systems in which each of the press members is directly attached to and urged forward by means of a separate hydraulic ram connected thereto.

Figure 5:
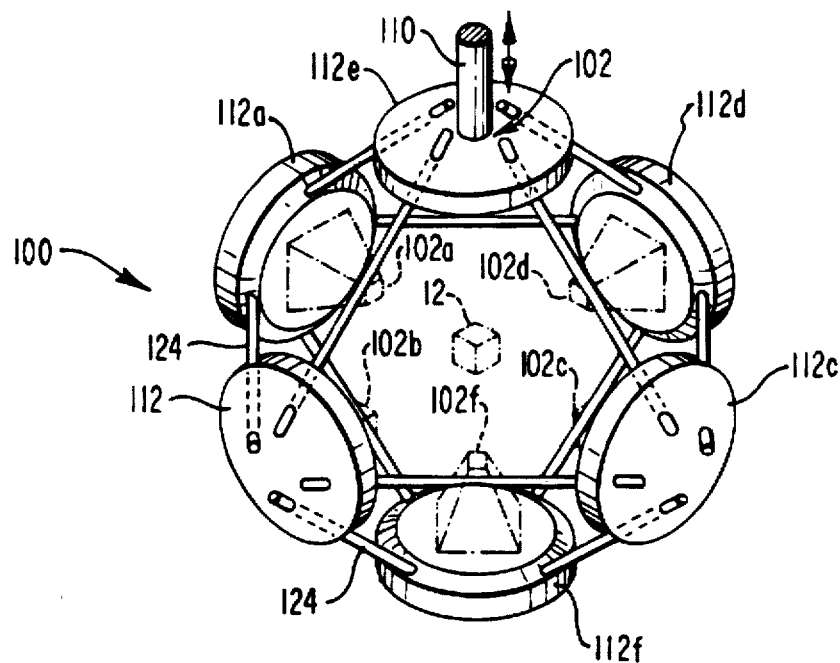
FIG. 5 is a diagrammatic perspective view of an embodiment of the present invention having a single hydraulic ram and six press members.

The simplest embodiment comprising a single hydraulic ram will now be considered. Turning to FIG. 5, it can be seen that each of the hydraulic rams except the hydraulic ram (not shown) connected to guide plate 112e at the top of the drawing has been eliminated. Guide plates 112a, b, c, d and f remain in place in order to transfer the forward thrusting forces from the press member connected to guide plate 112e to each of the press members connected to guide plates 112a, b, c, d, and f. The remainder of the stripped away unit is connected to and placed within a suitable rigid frame (not shown) wherein the single ram connected to guide plate 112e will provide forward and reverse thrust to move the guide system elements and associated press members inward and outward, as shown in FIG. 5. The two-way arrow associated with the piston attached to the press member associated with guide plate 112e indicates the existence of a hydraulic ram attached to the piston.

The guide system mechanically interconnects each of the press members together such that each press member is caused to move simultaneously and synchronously toward the common, or central, point. All twelve guide pin rods of the Anvil Guide System share in distributing the thrust of the single ram press to the cell (similar to cell 12 of FIG. 3) with equal intensity from all six sides just the same as would be achieved in a standard six ram Anvil Guide Cubic Press. Although the press member connected to guide plate 112f appears to be "fixed", it is only fixed relative to the rigid frame, which will usually be fixed relative to the floor or room in which the press happens to reside. However, relative to the central point, each of the press members is indeed "moveable" and moves toward the central point at the same rate and with the same force.

In a press containing a single hydraulic ram as shown in FIG. 5, it is clear that because there is no opposing hydraulic ram lying along the same axis as the single hydraulic ram it is necessary to provide an alternative means for opposing the force exerted by the single hydraulic ram. Otherwise, none of the press members would be capable of exerting any significant force on the material being compressed. The opposing force is, of course, provided by e.g. an immovable floor, a wall, or some other fixed structure such that the press member directly opposite the press member connected to the hydraulic ram is not free to move in the direction of the force of the hydraulic ram but opposes the force and movement.

Figure 6:
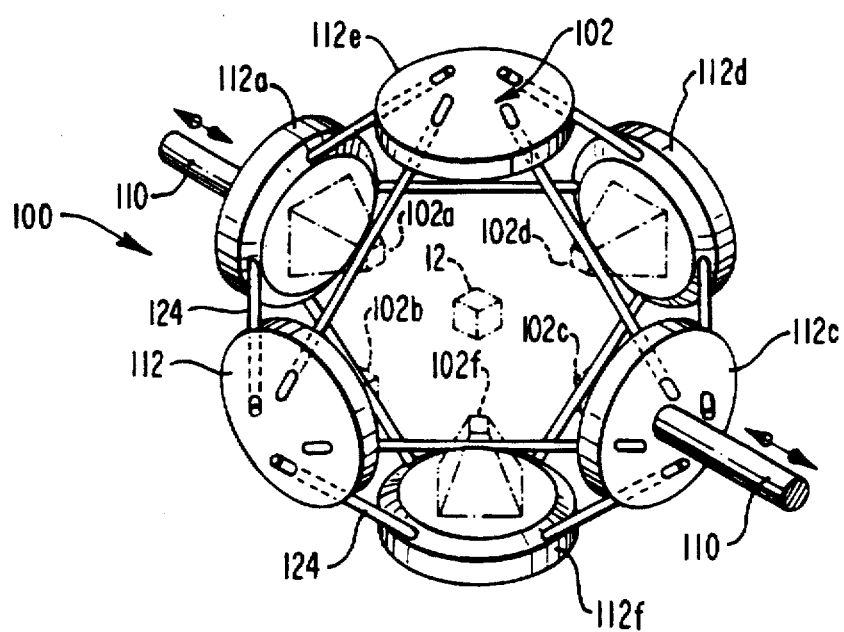
FIG. 6 is a diagrammatic perspective view of an embodiment of the present invention having two opposing hydraulic rams and six press members.
Figure 7:
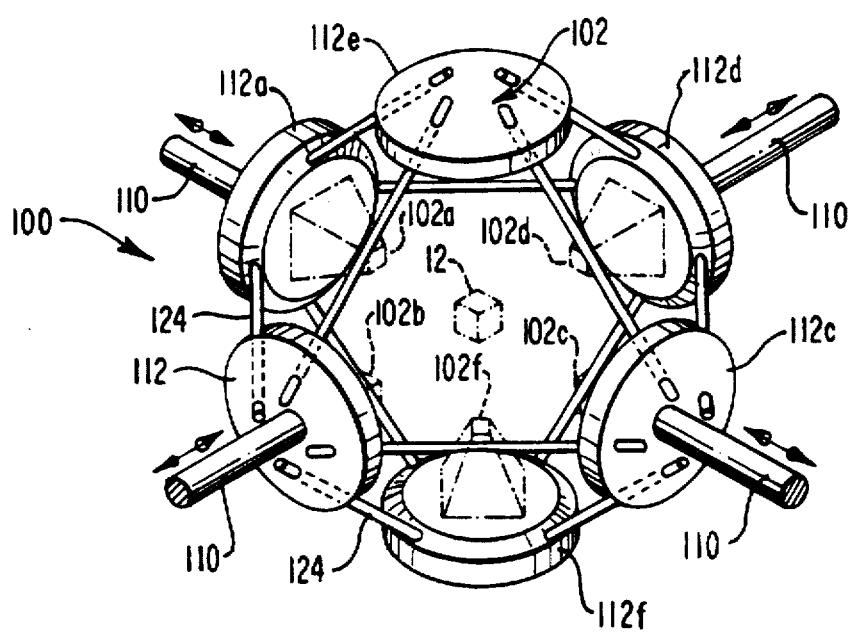
FIG. 7 is a diagrammatic perspective view of an embodiment of the present invention having four opposing hydraulic rams and six press members.

Of course, as will be shown in FIGS. 6 and 7, in those cases where there are an even number of hydraulic rams (such as 2 or 4), and wherein each two of the hydraulic rams are situated along a single common axis such that they oppose each other, there will be no apparently "fixed" press members (assuming the central point is "fixed" in space relative to, e.g., the room by means of the same rigid frame). In the case where there are paired hydraulic rams, the ram bodies can be fixed relative to the floor or room; however, because the ram pistons move in and out, there will be no press member that is "fixed" relative to the floor or room. In that case, the central point will indeed remain fixed relative to the floor, wall, or room.

Turning to FIG. 6, the high pressure press illustrated therein includes six moveable press members mechanically interconnected together by means of the inventive guide system as in the FIG. 5 (showing a single hydraulic ram). The only difference is that a second hydraulic ram (not shown) situated to oppose the first hydraulic ram (not shown) is included. Though the hydraulic rams are not shown, the force exerted by each is shown by the two-way arrows drawn next to the piston rods connected to the two press members associated with each of the two hydraulic rams, respectively.

Because the two hydraulic rams directly oppose each other, the two press members will move together at substantially the same rate and with the substantially the same force. Instead of an apparently "fixed" press member, the central point will remain "fixed" in space relative to the room. Each of the press members not connected to one of the two hydraulic rams is free to move when the hydraulic rams moves their respective press members. Other than the apparent fixedness of the central point rather than a press member, in all other respects the high pressure press, and in particular the guide system, of FIG. 6 operates in the same fashion as the high pressure press illustrated in FIG. 5 having a single hydraulic ram.

Similarly, the high pressure cubic press shown in FIG. 7 includes a total of four hydraulic rams (not shown) connected to four press members, as indicated by the four two-way arrows associated with the four pistons shown connected to four press members. Each of the hydraulic rams is paired with another hydraulic ram such that each of the hydraulic rams lies in the same axis as another hydraulic ram. In this manner, the hydraulic rams are each paired or associated with an opposing ram such that the rams and not the central point move relative to the room. Because there are four hydraulic rams lying along two axes, all four lie in a plane. All four of the press members connected to a hydraulic ram move together toward the fixed central point, while the two moveable press members lying along the axis normal to the plane also move together toward the central point by means of the guide system.

As can be seen from FIGS. 5–7, each of the press members moves toward the central point at substantially the same rate and with substantially the same force as a result of the inventive guide system regardless of the number of hydraulic rams. The difference, and the difference is merely a superficial one, is that in the case of there being an odd number of hydraulic rams one of the press members will appear to remain "fixed". However, it will only be "fixed" relative to the room or wall or object providing the opposing force to the unpaired hydraulic ram. In that case, the central point will move such that, in reality, each of the press members will still "move" toward the central point at substantially the same speed and with substantially the same force. Because of the this, the central point will at all times be substantially equidistant from each of the press members at any given point in time. All movements are therefore relative. So long as the central point is taken to be "fixed", regardless of whether it is actually moving or not, then it follows that none of the press members are "fixed" relative to the central point.

In conclusion, the present invention provides a high pressure press that is smaller, more lightweight, and which occupies less floor space compared to existing high pressure presses.

The present invention to further eliminates one or more of the hydraulic rams such that there is at least one fewer hydraulic ram than the number of press members such that at least one press member is not directly attached to a hydraulic ram.

In addition, the present invention simplifies the operation and maintenance of high pressure presses by eliminating one or more hydraulic rams, which are known to require individual maintenance in order to keep the entire system in good working order.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A high pressure cubic press device comprising:
   six press members at least five of which comprise moveable press members, each of the press members having a face oriented toward a central point and being mechanically interconnected such that the central point is substantially equidistant from each of the faces as the moveable press members are either moved towards or away from each of the other press members;
   one to five hydraulic rams each directly connected to one of the moveable press members by means of a piston member for providing pressing forces to the moveable press members and being capable of selectively urging the one to five of the moveable press members connected to a hydraulic ram such that the moveable press members can be selectively moved towards or away from the central point; and
   a guide system interconnecting the six press members for distributing the pressing forces from the one to five press members directly connected to a hydraulic ram to other of the moveable press members and for guiding movement of each of the moveable press members such that the moveable press members move simultaneously, synchronously, and symmetrically towards or away from the central point during urging of the at least one hydraulic ram and such that the central point is substantially equidistant from each of the faces of the six press members as the moveable press members are either moved towards or away from the central point, the guide system including rod means for directly connecting each one of the six press members with four of the other press members.

2. A high pressure cubic press device as defined in claim 1, wherein the press device includes a substantially nonmoveable press member and a single hydraulic ram connected to one of the moveable press members lying along a common axis with the substantially nonmoveable press member, and wherein each of the moveable press members is urged either toward or away from the central point as a result of the single hydraulic ram working in concert with the guide system.

3. A high pressure cubic press device as defined in claim 1, wherein the press device includes two hydraulic rams, each of which is separately connected to each of two of the press members lying along a common axis and wherein all six of the press members are moveable and are urged either toward or away from the central point as a result of the two hydraulic rams working in concert with the guide system.

4. A high pressure cubic press device as defined in claim 1, wherein the press device includes a substantially nonmoveable press member and three hydraulic rams, each of the hydraulic rams being separately connected to each of three of the moveable press members, wherein two of the press members connected to hydraulic rams lie along a common axis, wherein the third press member connected to a hydraulic ram lies along a common axis with the substantially nonmoveable press member and wherein each of the press members is urged either toward or away from the central point as a result of the three hydraulic rams working in concert with the guide system.

5. A high pressure cubic press device as defined in claim 1, wherein the press device includes four hydraulic rams lying in a single plane, each of which is separately connected to each of four of the press members and wherein all six of the press members are moveable and are urged either toward or away from the central point as a result of the four hydraulic rams working in concert with the guide system.

6. A high pressure cubic press device as defined in claim 1, wherein the press device includes a substantially nonmoveable press member and five hydraulic rams, each of the hydraulic rams being separately connected to each of the five moveable press members, wherein four of the press members connected to hydraulic rams lie in a single plane, wherein the fifth press member connected to a hydraulic ram lies along a common axis with the nonmoveable press member, and wherein each of the moveable press members is urged either toward or away from the central point as a result of the five hydraulic rams working in concert with the guide system.

7. A high pressure cubic press device as defined in claim 1, wherein the guide means further comprises:
   (a) six guide blocks, each of which is secured and fixed to a corresponding one of the press members, each of the guide blocks including a plurality of rectilinear openings therethrough, each of the rectilinear openings being axially aligned with a corresponding rectilinear opening in an adjacent guide block; and
   (b) a plurality of guide rods, each of which is slideably connected to two of the guide blocks, each of the guide rods having opposite ends positioned through a pair of corresponding rectilinear openings of adjacent guide blocks.

8. A high pressure cubic press device as defined in claim 1, wherein all of the press members are moveable such that the central point remains substantially fixed in space relative to a room in which the press device is located during movement of the press members either towards or away from the central point.

9. A high pressure cubic press device as defined in claim 1, wherein one of the press members is substantially nonmoveable such that the central point moves relative to a room in which the press device is located and towards or away from the substantially nonmoveable press member during movement of the moveable press members either towards or away from the central point.

10. A high pressure cubic press device as defined in claim 1, wherein the rod means includes twelve guide rods, each of which is slideably connected to and between two of the press members, each of the guide rods having opposite ends positioned through a pair of corresponding rectilinear openings within adjacent press members.

11. A high pressure cubic press device as defined in claim 1, wherein the guide system distributes the pressing forces from the one to five press members connected to a hydraulic ram to the other press members with sufficient force such that the high pressure cubic press yields synthetic diamonds.

12. A high pressure press device comprising:
   six press members which are moveable such that each of the press members can be selectively moved towards or away from a substantially fixed central point within a cube, each of the press members having a face oriented toward the central point and being mechanically interconnected such that the central point is substantially equidistant from each of the faces as the press members are either moved towards or away from the central point;
   two or four hydraulic rams, each of the hydraulic rams being directly connected to one of the press members by means of a piston member and being capable of providing pressing forces to the press members and selectively urging the press members connected thereto such that the press members can be selectively moved towards or away from the central point; and
   a guide system interconnecting the six press members for distributing the pressing forces from the press members directly connected to a hydraulic ram to the other press members and for guiding movement of each of the press members such that the press members move simultaneously, synchronously, and symmetrically towards or away from the central point during urging of the hydraulic rams and such that the central point is substantially equidistant from each of the faces as the press members are either moved towards or away from the central point, the guide system including means for directly connecting each of the press members with all but one of the other press members.

13. A high pressure press device as defined in claim 12, wherein the means for directly connecting each of the press members includes twelve guide rods, each of which is slideably connected to and between two of the press members, each of the guide rods having opposite ends positioned through a pair of corresponding rectilinear openings within adjacent press members.

14. A high pressure press device as defined in claim 12, wherein the guide system distributes the pressing forces from the press members connected to a hydraulic ram to the other press members with sufficient force such that the high pressure cubic press yields synthetic diamonds.

15. A high pressure press device comprising:
   six press members at least five of which comprise moveable press members, each of the press members having a face oriented toward a central point and being mechanically interconnected such that the central point is substantially equidistant from each of the faces as the moveable press members are either moved towards or away from the central point;
   one to five hydraulic rams, each of the hydraulic rams being connected to a corresponding one of the moveable press members by means of a piston member, each of the one to five hydraulic rams providing pressing forces to the corresponding press member and being capable of selectively urging the corresponding press member such that the corresponding press member can be selectively moved towards or away from the central point; and
   a guide system interconnecting the six press members for distributing the pressing forces from each of the press members directly connected to a hydraulic ram to other of the press members and for guiding movement of each of the moveable press members such that the moveable press members move simultaneously, synchronously, and symmetrically towards or away from the central point during urging of the one or more hydraulic rams and such that the central point is substantially equidistant from each of the faces of the six press members as the moveable press members are either moved towards or away from the central point, the guide system comprising:
   (a) six guide blocks, each of which is secured and fixed to a corresponding one of the press members, each of the guide blocks including a plurality of rectilinear openings therethrough, each of the rectilinear openings being axially aligned with a corresponding rectilinear opening in an adjacent guide block; and
   (b) a plurality of guide rods, each of which is slideably connected to two of the guide blocks, each of the guide rods having opposite ends positioned through a pair of corresponding rectilinear openings of adjacent guide blocks.

16. A high pressure press device defined in claim 15, wherein the press device includes a substantially nonmoveable press member and a single hydraulic ram connected to one of the moveable press members lying along a common axis with the substantially nonmoveable press member, and wherein each of the moveable press members is urged either towards or away from the center point as a result of the single hydraulic ram working in concert with the guide system.

17. A high pressure press device as defined in claim 15, wherein the press device includes two hydraulic rams, each of which is separately connected to each of two of the press members lying along a common axis and wherein all six of the press members are moveable and are urged either towards or away from the central point as a result of the two hydraulic rams working in concert with the guide system.

18. A high pressure press device as defined in claim 15, wherein the press device includes a substantially nonmoveable press member and three hydraulic rams, each of the hydraulic rams being separately connected to each of three of the moveable press members, wherein two of the press members connected to hydraulic rams lie along a common axis, wherein the third press member connected to a hydraulic ram lies along a common axis with the substantially nonmoveable press member and wherein each of the moveable press members is urged either towards or away from the central point as a result of the three hydraulic rams working in concert with the guide system.

19. A high pressure press device as defined in claim 15, wherein the press device includes four hydraulic rams lying in a single plane, each of which is separately connected to each of four of the press members and wherein all six of the press members are moveable and are urged either towards or away from the central point as a result of the four hydraulic rams working in concert with the guide system.

20. A high pressure press device as defined in claim 15, wherein the press device includes a substantially nonmoveable press member and five hydraulic rams, each of the hydraulic rams being separately connected to each of the five moveable press members, wherein four of the press members connected to hydraulic rams lie in a single plane, wherein the fifth press member connected to a hydraulic ram lies along a common axis with the substantially nonmoveable press member, and wherein each of the moveable press members is urged either toward or away from the central point as a result of the five hydraulic rams working in concert with the guide system.

* * * * *